United States Patent [19]

Tanaka et al.

[11] Patent Number: 5,523,801
[45] Date of Patent: Jun. 4, 1996

[54] UPPER AND LOWER ADJACENT PICTURE SIGNAL TRAPS

[75] Inventors: Yasushi Tanaka; George Fang, both of Nagaokakyo, Japan

[73] Assignee: Mitsubishi Denki Kabushiki Kaisha, Tokyo, Japan

[21] Appl. No.: 229,773

[22] Filed: Apr. 19, 1994

[30] Foreign Application Priority Data

Apr. 20, 1993 [JP] Japan .................................. 5-093114

[51] Int. Cl.$^6$ .................................................... H04N 5/62
[52] U.S. Cl. .......................... 348/737; 348/736; 348/735
[58] Field of Search ................................. 348/725, 735, 348/736, 737, 731, 738, 607; 358/196, 197, 198, 195.1; 455/179.1, 191.1, 339, 340, 307; H04N 5/60, 5/62

[56] References Cited

U.S. PATENT DOCUMENTS

| | | | |
|---|---|---|---|
| 3,562,417 | 2/1971 | Poppa | 348/736 |
| 4,263,619 | 4/1981 | Theriault | 348/736 |
| 5,034,994 | 7/1991 | Muterspaugh | 348/735 |
| 5,159,711 | 10/1992 | Ma | 455/307 |

FOREIGN PATENT DOCUMENTS

| | | |
|---|---|---|
| 52-71929 | 6/1977 | Japan . |
| 61-162186 | 10/1986 | Japan . |
| 55-141871 | 4/1993 | Japan . |

*Primary Examiner*—James J. Groody
*Assistant Examiner*—Sherrie Hsia

[57] ABSTRACT

To provide a picture intermediate frequency circuit capable of preventing the occurrence of intermodulation beats in a strong electrical field, without affecting in any way the original picture signal. A picture intermediate frequency signal output from the tuner 2 is supplied to a pre-amplifier 5 via an adjacent sound trap circuit 4, and picture trap circuits 11 and 12, both of which are connected in series. Trap circuits 11 and 12 have an attenuation point in the upper and lower frequency components, respectively, equivalent to the frequency difference of the adjacent picture signal frequency with respect to the picture intermediate frequency signal, and trap the ±6 MHz frequency components of the picture intermediate frequency signal. This allows the trap circuits 11 and 12 to remove unnecessary adjacent picture signals before they reach the pre-amplifier 5. As a result, the high frequency component generated in the non-linear region of the pre-amplifier 5 in a strong electrical field is prevented from interfering with the high frequency component of the unnecessary adjacent picture signals that produce cross-modulation signals, thus eliminating the occurrence of cross-modulation beats.

16 Claims, 4 Drawing Sheets

5,523,801

UPPER AND LOWER ADJACENT PICTURE SIGNAL TRAPS

BACKGROUND OF THE INVENTION

1. Field of the Invention

The invention relates to a picture intermediate frequency circuit incorporated in a television receiver or the like.

2. Description of the Related Art

FIG. 4 is a circuit diagram of a conventional picture intermediate frequency circuit incorporated in a television receiver or the like. In the Figure, reference numeral 1 denotes an antenna; and reference numeral 2 denotes a tuner. The picture intermediate frequency signal output from terminal 2a of the tuner 2 is supplied to a picture signal processing circuit 8 via a matching circuit 3, an adjacent sound trap circuit 4, a pre-amplifier 5, a surface acoustic wave filter (hereinafter referred to as "SAW FILTER") 6, and a matching circuit 7.

Next, a simple description of the operation thereof will be given. A television signal or the like is input into the antenna 1. Then, at the tuner 2, a desired frequency of the television signal or the like is selected and amplified. A picture intermediate frequency signal produced by the conversion of the signal to that having a frequency range in the picture intermediate frequency region is output from the terminal 2a of the tuner 2.

The picture intermediate frequency signal output from the terminal 2a of the tuner 2 is input to the adjacent sound trap circuit 4 via the impedance matching circuit 3 for impedance matching. The trap circuit 4 is a typical notch filter circuit, which is called a bifilar T-type trap comprising a capacitor C4a and reactors L4a and L4b. It traps the channel sound carrier at the adjacent lower side of the picture signal to be received, and thereby removes interference in the picture to be received caused by the adjacent sound carrier.

The pre-amplifier 5 converts the impedance of the picture signal output from the adjacent sound trap circuit 4, and pre-amplifies the signal at a predetermined gain which precompensates for the attenuation to be caused by the SAW filter 6 (which follows the pre-amplifier 5). In the pre-amplifier 5, transistor Tr5a is a transistor comprising a buffer which converts impedance, and transistor Tr5b is a pre-amplifying transistor.

In the SAW filter 6, the predetermined frequency characteristic is given to the picture intermediate frequency signal, so that gain of the various transmitted signals can be adjusted by amount suitable for detecting vestigial side-band transmission signals. Then, the signal input to the picture signal processing circuit 8, via the impedance matching circuit 7 for impedance matching, is amplified to a picture intermediate frequency signal-this amplification method being well known. Then, the amplified signal is detected, afterwhich it is amplified and formed into to an AGC (Automatic Gain Control) voltage signal.

The picture signal SV output from the picture signal processing circuit 8 is introduced into terminal 9. The AGC voltage obtained at terminal 8a of the picture signal processing circuit 8 is supplied to AGC 2b of the tuner 2 via an AGC feedback circuit 10. Accordingly, a high-frequency amplifier of the tuner 2 is controlled such that it amplifies in accordance with the wave strength, which results in controlling the picture signal SV at a constant level irrespective of the wave strength.

Other conventional picture intermediate frequency circuits of television receivers and the like related to the present invention are disclosed, for example, in Japanese Patent Laid-Open No. 55-141871, Japanese Patent Laid-Open No. 52-71929, and Japanese Utility Model Laid-Open No. 61-162186.

Since the conventional picture intermediate frequency circuits have the above-described arrangement, the gain distribution of each of the amplifying components, namely, the tuner 2, the pre-amplifier 5, and the picture signal processing circuit 8 had to be set precisely. Otherwise, the picture intermediate frequency signal, particularly the signal at the pre-amplifier 5 in a strong electrical field, will exceed the dynamic range. This causes a high frequency signal produced in the non-linear region of the pre-amplifier 5 to interfere with a high frequency wave of the unnecessary adjacent picture signal present in the desired picture intermediate frequency of ±6 MHz (for example, in case of the NTSC system), which results in intermodulation, wherein a beat is mixed in the picture signal, so that it is difficult to see the picture clearly.

SUMMARY OF THE INVENTION

The present invention intends to overcome such a problem by providing a picture intermediate frequency circuit which is capable of preventing the occurrence of intermodulation beats in a strong electrical field, without affecting in any way the original picture signal.

To this end, there is provided according to the present invention a picture intermediate frequency circuit comprising a surface acoustic wave filter for giving a predetermined frequency characteristic to a picture intermediate frequency signal; a pre-amplifier for compensating for signal attenuation caused by the surface acoustic wave filter; and a trap means which traps the offsetted upper and lower frequency components with the offset equivalent to the frequency difference between the picture intermediate frequency signal and the adjacent picture signal, present in the circuit components preceding the pre-amplifier.

In the invention, the trap means traps the offsetted lower and upper frequency components with the offset equivalent to the frequency difference of the adjacent picture signal with respect to the picture intermediate frequency signal, present in the circuit components preceding the pre-amplifier. Thus, intermodulation signals are not produced by interference of the high frequency component in the picture intermediate frequency signals produced in the non-linear region of the pre-amplifier in a strong electrical field with the high frequency component of the adjacent picture signal, thereby eliminating the occurrence of intermodulation beats.

DESCRIPTION OF THE PREFERRED EMBODIMENT

Figure 1:
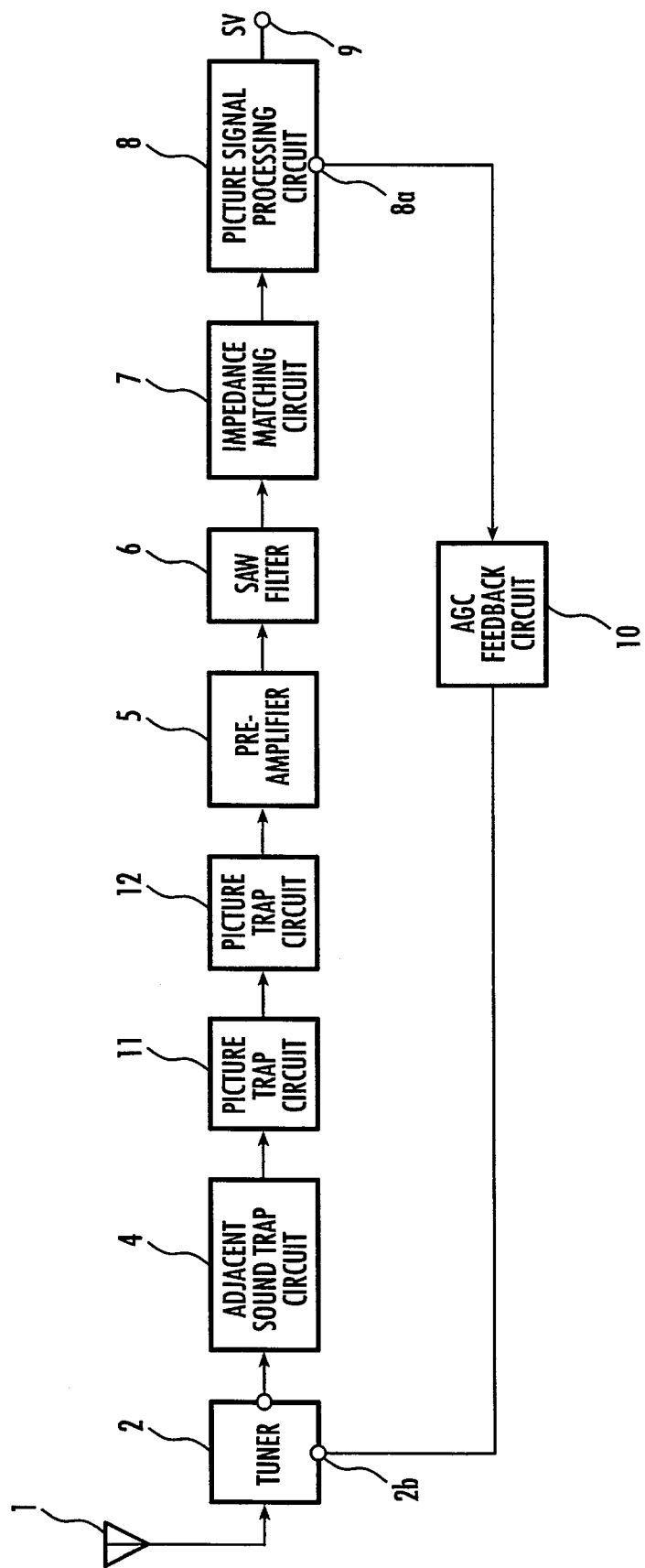
FIG. 1 is a block diagram illustrating an embodiment of a picture intermediate frequency circuit related to the present invention.
Figure 4:
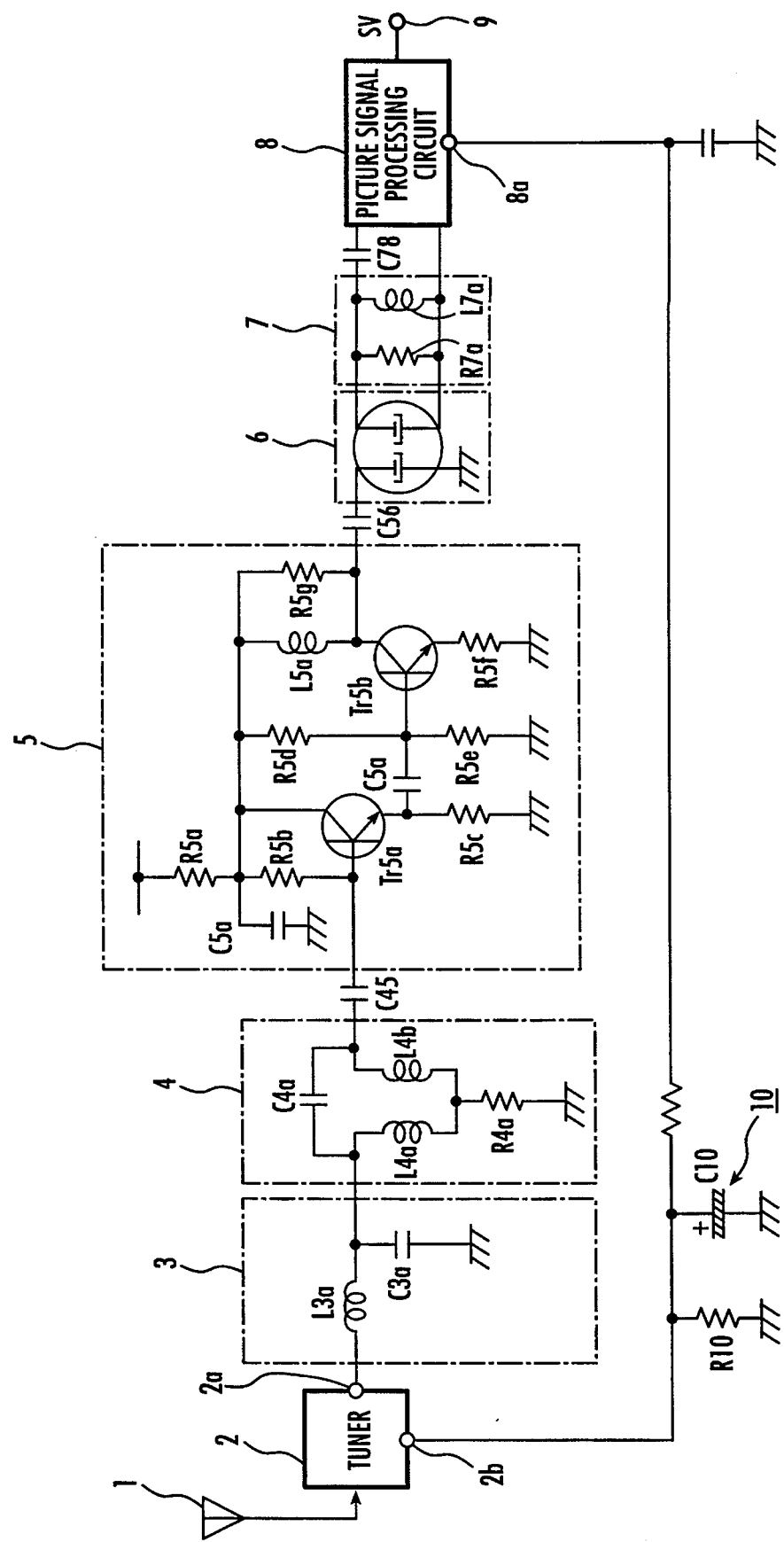
FIG. 4 is a circuit diagram illustrating a conventional picture intermediate frequency circuit.

FIG. 1 is a block diagram of an embodiment of the picture intermediate frequency circuit related to the invention. In the Figure, circuit components corresponding to those in FIG. 4 are given the same reference numerals.

In the picture intermediate frequency circuit of FIG. 1, the picture intermediate frequency signal obtained at the terminal 2a of the tuner 2 is supplied to the pre-amplifier 5 via the adjacent sound trap circuit 4, the picture trap circuits 11 and 12 comprising the trap means, both of which are connected in series. Since a buffer for impedance matching is provided in the picture trap circuits 11 and 12, the matching circuit 3 of FIG. 4 is not included. The picture intermediate frequency circuit will be hereunder described as receiving a signal produced by the NTSC system.

The picture trap circuits 11 and 12 each have an attenuation point in the upper and lower frequency components of the adjacent picture signals with respect to the picture intermediate frequency signal. Here, the frequency difference of the adjacent picture signal with respect to the picture intermediate frequency signal is, for example, in the NTSC system, 6 MHz. If the picture intermediate frequency is assumed as fIF, the frequency component equivalent to fIF−6 MHz is trapped in the picture trap circuit 11. On the other hand, in the picture trap circuit 12, a frequency component equivalent to fIF+6 MHz is trapped.

The ordering of the picture trap circuits 11 and 12 of FIG. 1 may be reversed.

The present embodiment is arranged in the above-described way.

In the present embodiment, the picture trap circuits 11 and 12 trap the lower and upper frequency components of the adjacent picture signals with respect to the picture intermediate frequency signal, with circuit components preceding the pre-amplifier 5. That is to say, unnecessary adjacent picture signals are removed with circuit components preceding the pre-amplifer 5.

Accordingly, as shown in the example of FIG. 1, the high frequency component of the picture intermediate frequency signal produced in the non-linear region of the pre-amplifier 5 in a strong electrical field does not interfere with the high frequency component of the unnecessary adjacent picture signal. This eliminates the occurrence of intermodulation beats, which results in improved picture quality.

Figure 2:
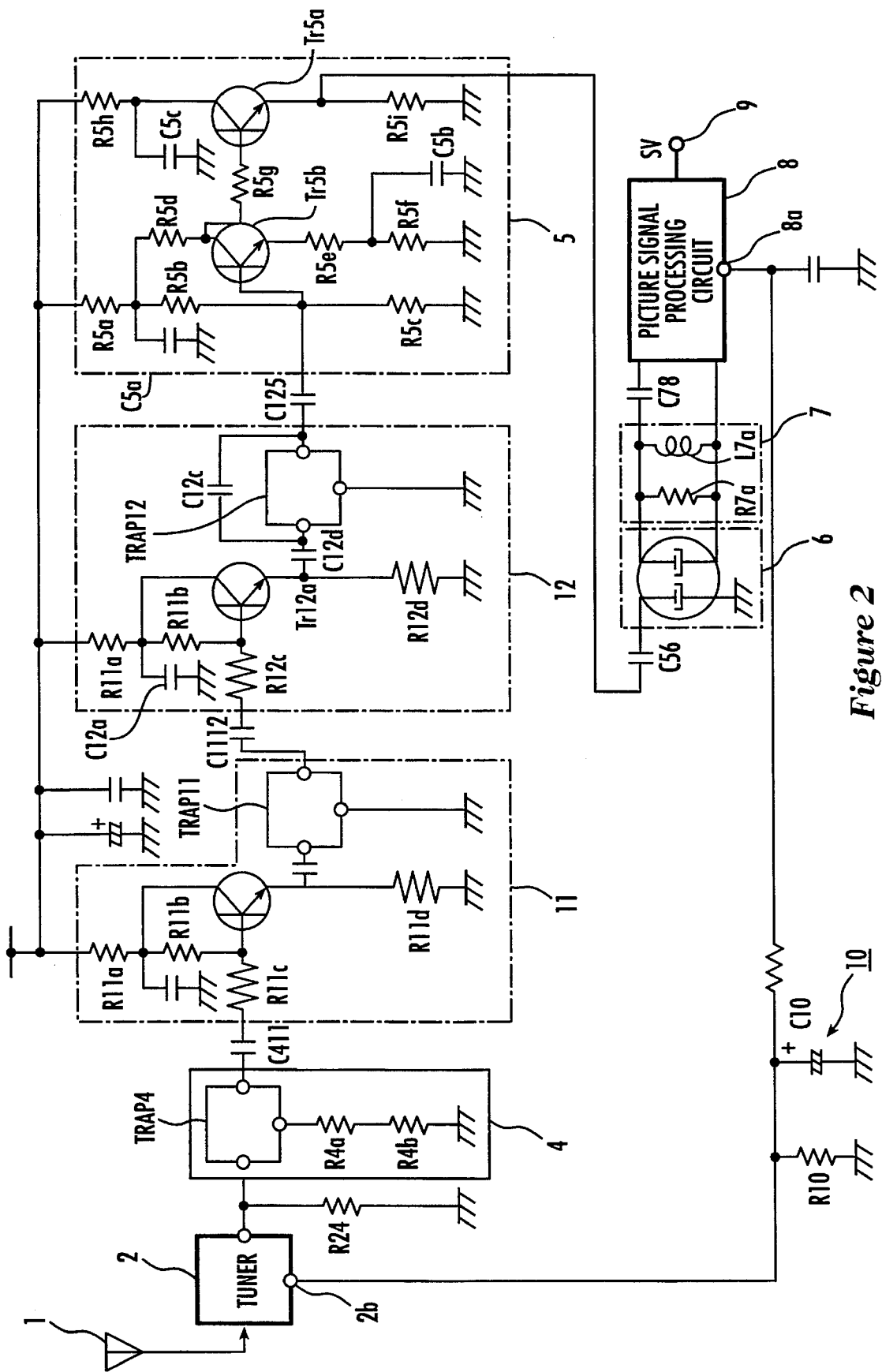
FIG. 2 is a circuit diagram illustrating a detailed arrangement of the embodiment of FIG. 1.

FIG. 2 is a circuit diagram illustrating an example of a detailed arrangement of the embodiment of FIG. 1, in which the component portions corresponding to those in FIGS. 1 and 4 are given identical reference numerals. The corresponding component portions are not described in detail below.

Figure 3:
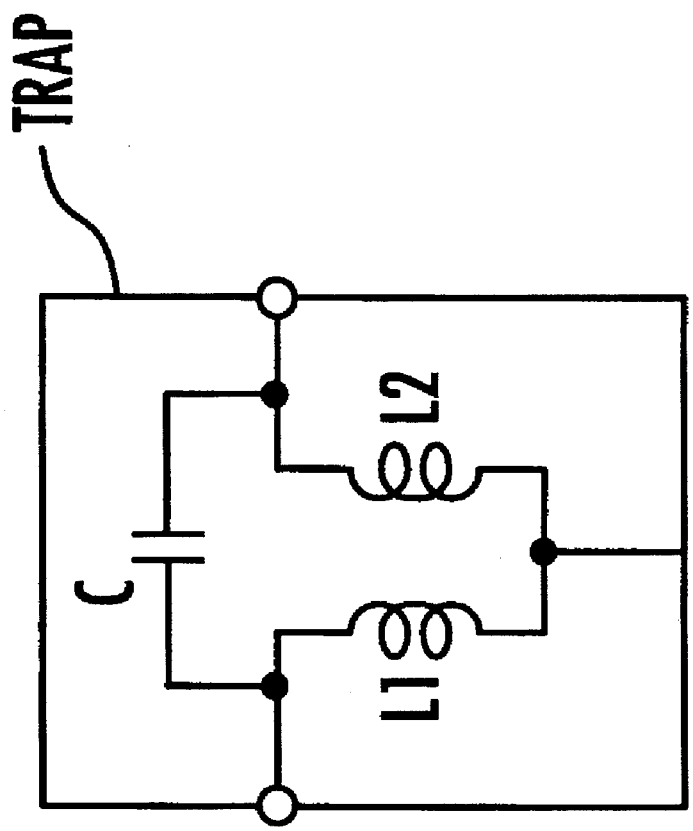
FIG. 3 is a circuit diagram of an example of a structure of each of the trap circuits in FIG. 1.

In FIG. 2, the trap portion TRAP 4 in the adjacent sound trap circuit 4 comprises a notch filter circuit, called a bifilar T-type trap circuit including a capacitor C and inductors L1 and L2, such as those shown in FIG. 3. This is of the same type as the conventional one.

In the picture trap circuits 11 and 12, the transistors Tr11a and Tr12a are both buffer transistors for forming a buffer circuit for impedance matching, and the trap portions TRAP 11 and TRAP 12 are both trap circuits for trapping a predetermined frequency component. The trap portions TRAP 11 and TRAP 12, each comprise a notch filter circuit, called a bifilar T-type trap, as shown in FIG. 3. The frequency to be trapped is determined by the capacitance of the capacitor C, and the inductance of each of the reactors L1 and L2 (the capacitor and reactors being shown in FIG. 3) and further, for example, the capacity of a capacitor C12c connected across the TRAP 12 (see FIG. 2) and the resistance of the resistor (not illustrated) connected to the ground side of the above-described reactors.

In the pre-amplifier 5, a transistor Tr5a comprises a buffer for converting the impedance, and a transistor Tr5b is a pre-amplifying transistor. The buffer circuit and the amplifying circuit are positioned differently compared to those of the conventional pre-amplifier 5 of FIG. 4, but the operation is basically the same.

A simple description of the operation will be given. A television signal is input to the antenna Then, the tuner 2 selects and amplifies only the desired frequency of the television signal. The television signal or picture intermediate frequency signal which is a signal converted to that having a frequency in the picture intermediate frequency band (picture carrier: 45.75 MHz) is output from the terminal 2a of the tuner 2.

The picture intermediate frequency signal output from the terminal 2a of the tuner 2 is input to the adjacent sound trap circuit 4. In the trap circuit 4, a sound carrier frequency component (47.25 MHz) at the adjacent lower side is trapped to remove a sound beat generated by interference with the sound carrier of the channel.

Next, the output of the adjacent sound trap circuit 4 is input to the picture trap circuit 11. In the picture trap circuit 11, the output signal passes through the buffer circuit for impedance matching. Then, to prevent interference with the channel picture carrier at the adjacent upper side, the trap portion TRAP 11 traps the frequency component of 45.75−6.0=39.75 MHz.

The output of the picture trap circuit 11 is input to the picture trap circuit 12. In the picture trap circuit 12, the output signal passes through the buffer circuit for impedance matching. Then, to prevent interference with the channel picture carrier at the adjacent lower side, the trap portion TRAP 12 including the capacitor C12C traps the frequency component of 45.75+6.0=51.75 MHz.

The output of the picture trap circuit 12 is input to the pre-amplifier 5. The pre-amplifier 5 pre-amplifies at a predetermined gain which compensates for attenuation in the SAW filter 6 which follows.

In the SAW filter 6, a predetermined frequency characteristic is given to the picture intermediate frequency signal to carry out gain adjustments of the various transmission signals suitable for detecting vestigial sideband transmission signals. Then, via the impedance matching circuit 7 for impedance matching, the signal input to the picture signal processing circuit 8 is amplified to a picture intermediate frequency signal, after which this picture signal is detected. The picture signal is then amplified and formed to an AGC (Automatic Gain Control) voltage signal. The picture signal SV output from the picture signal processing circuit 8 is introduced into the terminal 9.

In the formation of the AGC voltage signal, the processing circuit 8 detects the level of the picture intermediate frequency carrier wave, which is input therein. The carrier wave returns to the internal AGC circuit (not shown) and passes from the terminal 8a to the terminal 2b, such that the AGC of the tuner 2 is controlled, thereby allowing operation at an overall carrier wave level which is always constant.

As described above, the picture trap circuits 11 and 12 may be placed in any order, that is the circuit 11 may be placed before circuit 12 and viceversa. It is, however, preferable to place the trap circuits 11 and 12 before the preamplifier 5 (as shown in FIG. 1). This is because, although the tuner 2 gain may also be controlled by the AGC voltage output from the terminal 8a of the picture signal processing circuit 8 in accordance with the picture carrier level, the gain is, strictly speaking, controlled by the level of the picture intermediate frequency carrier, which is input in the picture signal processing circuit 8, with the result that amplified unnecessary bands are not controlled in the preceding component parts. In other words, when the preamplifier 5 is placed before the trap circuits 11 and 12, and when excessive signals are input, amplified unnecessary bands are amplified by the pre-amplifier 5, causing the high frequency components to interfere with each other and to produce a beat in the picture. Accordingly, it is preferable to place the trap circuits 11 and 12 before the pre-amplifier 5 to remove the unnecessary frequency components.

In the above-described embodiment, there has been described a circuit based on the NTSC system intended for North American countries. The invention is, however, not limited thereto but may be otherwise variously embodied within the scope of the claims.

As described above, according to the picture intermediate frequency circuit of the invention, a trap means removes the unnecessary adjacent picture signals before they reach the pre-amplifier, so that the high frequency component of the picture intermediate frequency signals produced in the non-linear region of the pre-amplifier in a strong electrical field does not interfere with the high frequency component of the unnecessary adjacent picture signals to produce cross-modulated signals, thereby preventing the occurrence of cross-modulation beats and improving the picture quality. This is made possible by virtue of the arrangement of the picture intermediate frequency circuit comprising a surface acoustic wave filter for giving a predetermined frequency characteristic to the picture intermediate frequency circuit, a pre-amplifier for compensating the signal attenuation caused by the surface acoustic wave filter, and trap means for trapping the upper and lower frequency components of the adjacent picture signals with respect to the picture intermediate frequency signal which are present at the circuit components that precede the pre-amplifier.

What is claimed is:

1. In an apparatus having a tuner which selects a picture intermediate frequency signal, a circuit comprising:
    a first trap circuit receiving a signal from the tuner and having a first attenuation notch in an upper adjacent picture signal with respect to the picture intermediate frequency signal;
    a second trap circuit receiving a signal from said first trap circuit and having a second attenuation notch in a lower adjacent picture signal with respect to the picture intermediate frequency signal;
    a surface acoustic wave filter; and
    an amplifier connected between said second trap circuit and said surface acoustic wave filter that precompensates for attenuation caused by said surface acoustic wave filter,
    wherein said surface acoustic wave filter imposes a predetermined frequency characteristic on a signal from said second trap circuit.

2. The circuit according to claim 1 wherein said first trap circuit includes a bifilar T-type trap circuit.

3. The circuit according to claim 1 wherein said first trap circuit includes an impedance matching buffer.

4. The circuit according to claim 1 wherein said second trap circuit includes a bifilar T-type trap circuit.

5. The circuit according to claim 1 wherein said second trap circuit includes an impedance matching buffer.

6. The circuit according to claim 1 wherein the first and second attenuation notches are symmetrical with respect to the frequency of the picture intermediate frequency signal.

7. The circuit according to claim 1 wherein the tuner receives an NTSC signal and wherein the first attenuation notch of said first trap circuit is 6 Mhz higher than the picture intermediate frequency signal and the second attenuation notch of said second trap circuit is 6 Mhz lower than the picture intermediate frequency signal.

8. The circuit according to claim 1 wherein said amplifier includes an impedance converting buffer.

9. In an apparatus having a tuner which selects a picture intermediate frequency signal, a circuit comprising:
    a first trap circuit receiving a signal from the tuner and having a first attenuation notch in a lower adjacent picture signal with respect to the picture intermediate frequency signal;
    a second trap circuit receiving a signal from said first trap circuit and having a second attenuation notch in an upper adjacent picture signal with respect to the picture intermediate frequency signal;
    a surface acoustic wave filter; and
    an amplifier connected between said second trap circuit and said surface acoustic wave filter that precompensates for attenuation caused by said surface acoustic wave filter,
    wherein said surface acoustic wave filter imposes a predetermined frequency characteristic on a signal from said second trap circuit.

10. The circuit according to claim 9, wherein said first trap circuit includes a bifilar T-type trap circuit.

11. The circuit according to claim 9, wherein said first trap circuit includes an impedance matching buffer.

12. The circuit according to claim 9, wherein said second trap circuit includes a bifilar T-type trap circuit.

13. The circuit according to claim 9, wherein said second trap circuit includes an impedance matching buffer.

14. The circuit according to claim 9, wherein the first and second attenuation notches are symmetrical with respect to the frequency of the picture intermediate frequency signal.

15. The circuit according to claim 9, wherein the tuner receives an NTSC signal and wherein the first attenuation notch of said first trap circuit is 6 Mhz lower than the picture intermediate frequency signal and the second attenuation notch of said second trap circuit is 6 Mhz higher than the picture intermediate frequency signal.

16. The circuit according to claim 9, wherein said amplifier includes an impedance converting buffer.

* * * * *